United States Patent
Kim

(10) Patent No.: US 10,132,234 B2
(45) Date of Patent: Nov. 20, 2018

(54) METHOD AND SYSTEM FOR CONTROLLING TURBOCHARGER OF VEHICLE

(71) Applicant: HYUNDAI MOTOR COMPANY, Seoul (KR)

(72) Inventor: Hyun Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 194 days.

(21) Appl. No.: 15/342,320

(22) Filed: Nov. 3, 2016

(65) Prior Publication Data
US 2017/0350311 A1   Dec. 7, 2017

(30) Foreign Application Priority Data
Jun. 7, 2016 (KR) .................. 10-2016-0070498

(51) Int. Cl.
   F02B 37/18     (2006.01)
   F02B 37/007    (2006.01)
   F02B 37/00     (2006.01)
   F02D 41/00     (2006.01)

(52) U.S. Cl.
   CPC .......... *F02B 37/18* (2013.01); *F02B 37/001* (2013.01); *F02B 37/007* (2013.01); *F02D 41/0007* (2013.01); *F02D 2200/0406* (2013.01); *Y02T 10/144* (2013.01)

(58) Field of Classification Search
   CPC ...... F02B 37/18; F02B 37/007; F02B 37/001; F02B 37/002
   See application file for complete search history.

(56) References Cited

U.S. PATENT DOCUMENTS

| 5,845,495 A | * | 12/1998 | Schray | .................. | F02B 37/007 60/612 |
| 6,338,250 B1 | * | 1/2002 | Mackay | ................ | F02B 37/007 60/612 |
| 2012/0317958 A1 | * | 12/2012 | Karcher | ................ | F02B 37/007 60/273 |

(Continued)

FOREIGN PATENT DOCUMENTS

| JP | H07-293302 A | 11/1995 |
| JP | 2008-095587 A | 4/2008 |

(Continued)

*Primary Examiner* — Patrick Maines
(74) *Attorney, Agent, or Firm* — McDermott Will & Emery LLP

(57) ABSTRACT

A method of controlling a turbocharger of a vehicle includes determining, by a controller, a target boost pressure of intake air of a plurality of turbochargers according to one or more vehicle driving conditions, and determining target opening ratios of a plurality of wastegates respectively provided in the plurality of turbochargers, according to the target boost pressure, determining, by the controller, whether or not a current opening ratio detected by an opening ratio sensor of any one wastegate of the plurality of wastegates is lower than the target opening ratio of the associated wastegate by a reference value, and limiting, by the controller, a maximum rpm of the turbocharger having the associated wastegate when it is determined that the current opening ratio of the associated wastegate is lower than the target opening ratio by the reference value.

8 Claims, 2 Drawing Sheets

(56) References Cited

U.S. PATENT DOCUMENTS

| | | | |
|---|---|---|---|
| 2014/0067230 A1* | 3/2014 | Liu | F02D 41/0007 701/102 |
| 2015/0159544 A1* | 6/2015 | Cowgill | F02B 37/002 60/602 |
| 2015/0159545 A1* | 6/2015 | Cowgill | F02B 37/002 60/602 |
| 2017/0298810 A1* | 10/2017 | Thompson | F02B 37/12 |

FOREIGN PATENT DOCUMENTS

| | | |
|---|---|---|
| JP | 2010-059851 A | 3/2010 |
| JP | 2014-101813 A | 6/2014 |
| JP | 2015-178809 A | 10/2015 |
| JP | 2015-209789 A | 11/2015 |
| KR | 10-2004-0034760 A | 4/2004 |
| KR | 10-2011-0060934 A | 6/2011 |
| KR | 10-1552061 B1 | 9/2015 |
| WO | 2010/039596 A2 | 4/2010 |

\* cited by examiner

1

METHOD AND SYSTEM FOR CONTROLLING TURBOCHARGER OF VEHICLE

CROSS REFERENCE TO RELATED APPLICATION

The present application claims the benefit of priority to Korean Patent Application No. 10-2016-0070498, filed Jun. 7, 2016 with the Korean Intellectual Property Office, the entire contents of which is incorporated herein for all purposes by this reference.

TECHNICAL FIELD

The present disclosure relates to a turbocharger that functions to increase an intake air volume by using the flow energy of engine exhaust.

BACKGROUND

In a vehicle provided with a turbocharger, a wastegate may be provided in the turbocharger so as to control the load acting on a turbine of the turbocharger by enabling bypassing by exhaust gases flowing to the turbocharger. In the related art, the wastegate may be configured as a pneumatically controlled wastegate or as an electronically controlled wastegate.

Particularly, the electronically controlled wastegate can perform precise control for the opening ratio of the wastegate, thereby functioning to control an operation of the turbocharger by controlling the flow rate of exhaust gases flowing into the turbine, thus controlling turbine rpm, intake air boost pressure, etc.

Exhaust gases passing through both the turbine and the wastegate of the turbocharger may include various impurities. The impurities may easily adhere to the wastegate and may cause a wastegate to cease functioning properly, so a malfunction of the turbocharger in which the opening ratio of the wastegate fails to reach a target opening ratio may occur.

Particularly, when the opening ratio of the wastegate fails to reach the target opening ratio during high speed driving of a vehicle, the turbine rpm may excessively increase and this may cause adverse effects of the turbine. Thus, to realize an efficient operation of the turbocharger, it is advantageous to appropriately control the wastegate based on a correct understanding of the operation of the wastegate.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a technique capable of efficiently preventing breakage of a turbocharger caused by a malfunction of a wastegate of the turbocharger based on correct and efficient determination of the malfunction of the wastegate.

According to one aspect of the present disclosure, there is provided a method of controlling a turbocharger of a vehicle, the method including: determining, by a controller, a target boost pressure of intake air of a plurality of turbochargers according to one or more vehicle driving conditions, and determining target opening ratios of a plurality of wastegates respectively provided in the plurality of turbochargers, according to the target boost pressure; determining, by the controller, whether or not a current opening ratio detected by an opening ratio sensor of any one wastegate of the plurality of wastegates is lower than the target opening ratio of the associated wastegate by a reference value; and limiting, by the controller, a maximum rpm of the turbocharger having the associated wastegate when it is determined that the current opening ratio of the associated wastegate is lower than the target opening ratio by the reference value.

The reference value may be pre-set for each of the plurality of wastegates and is stored in the controller.

The reference value may be pre-set in such a way that reference values of the respective wastegates are individually determined in consideration of critical rpms of the turbochargers having the respective wastegates.

In embodiments of the method, the controller limits the maximum rpm of the turbocharger having the associated wastegate when it is determined that a current boost pressure of intake air is equal to or lower than the target boost pressure and the current opening ratio of the associated wastegate is lower than the target opening ratio by the reference value.

In the method, the controller limits the maximum rpm of at least one turbocharger having the wastegate of which the current opening ratio is lower than the target opening ratio by the reference value.

In the method, the controller limits the maximum rpm of the turbocharger by limiting the target boost pressure.

In the method, the controller controls the plurality of wastegates using a data map in which the target opening ratios of the plurality of wastegates are pre-set according to the target boost pressure of intake air.

According to another aspect of the present disclosure, there is provided a system for controlling a turbocharger of a vehicle, the system including: a plurality of turbochargers; a plurality of wastegates respectively provided in the turbochargers and controlling flow rates of exhaust gases passing through the turbochargers; a plurality of opening ratio sensors provided on the respective wastegates and measuring opening ratios of the wastegates; a boost pressure sensor provided on an intake air flow line at a location in a downstream of the plurality of turbochargers and detecting a current boost pressure of intake air; and a controller that sets a target boost pressure of intake air of the plurality of turbochargers according to vehicle driving conditions, sets target opening ratios of the plurality of wastegates according to the target boost pressure, determines whether or not a current opening ratio detected by an opening ratio sensor of any one wastegate of the plurality of wastegates is lower than the target opening ratio of the associated wastegate by a reference value or less, limits a maximum rpm of the turbocharger having the associated wastegate when it is determined that the current opening ratio is lower than the target opening ratio by the reference value.

As described above, the method and system for controlling a turbocharger of a vehicle according to the present disclosure can efficiently prevent breakage of the turbocharger caused by a malfunction of a wastegate based on correct and efficient determination of the malfunction of the wastegate.

Particularly, in a vehicle having a plurality of turbochargers and a plurality of wastegates, the control method and system of the present disclosure can correctly and efficiently determine a malfunction of any one wastegate by determining whether or not the difference between the current opening ratio and the target opening ratio of the wastegate is equal to or greater than a reference value.

Further, when the difference between the current opening ratio and the reference opening ratio of the wastegate is equal to or greater than the reference value, the control method and system of the present disclosure limits the maximum rpm of the turbocharger having the wastegate, thereby efficiently preventing breakage of the turbocharger even when the wastegate of the turbocharger malfunctions.

Further, in the control method and system of the present disclosure, the reference numeral is pre-set in such a way that reference values of the respective wastegates are determined in consideration of the critical rpms of the turbochargers having the respective wastegates, thus the control method and system can more correctly and efficiently determine the malfunction of any one wastegate, thereby efficiently preventing breakage of the turbocharger having the wastegate.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Exemplary embodiments of the present disclosure will be described hereafter in detail with reference to the accompanying drawings.

Figure 1:
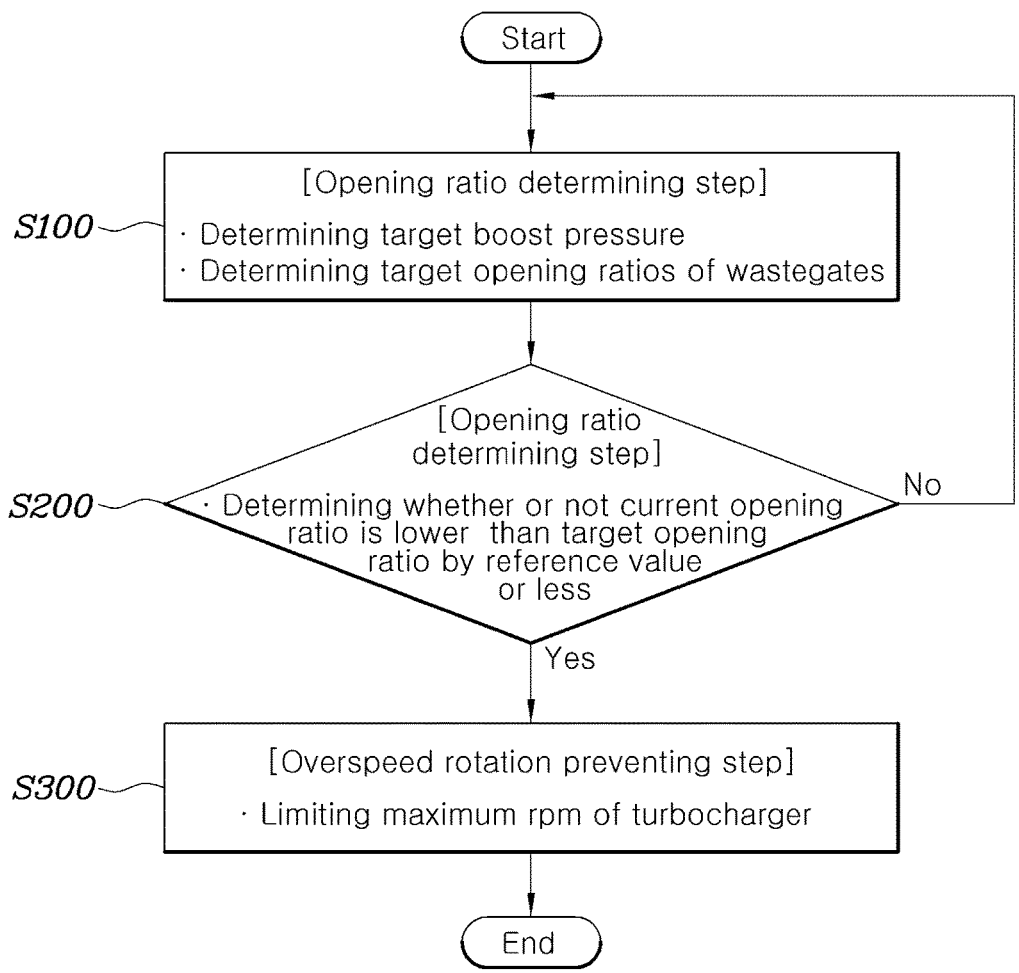
FIG. 1 is a flowchart of a method of controlling a turbocharger of a vehicle according to an exemplary embodiment of the present disclosure.
Figure 2:
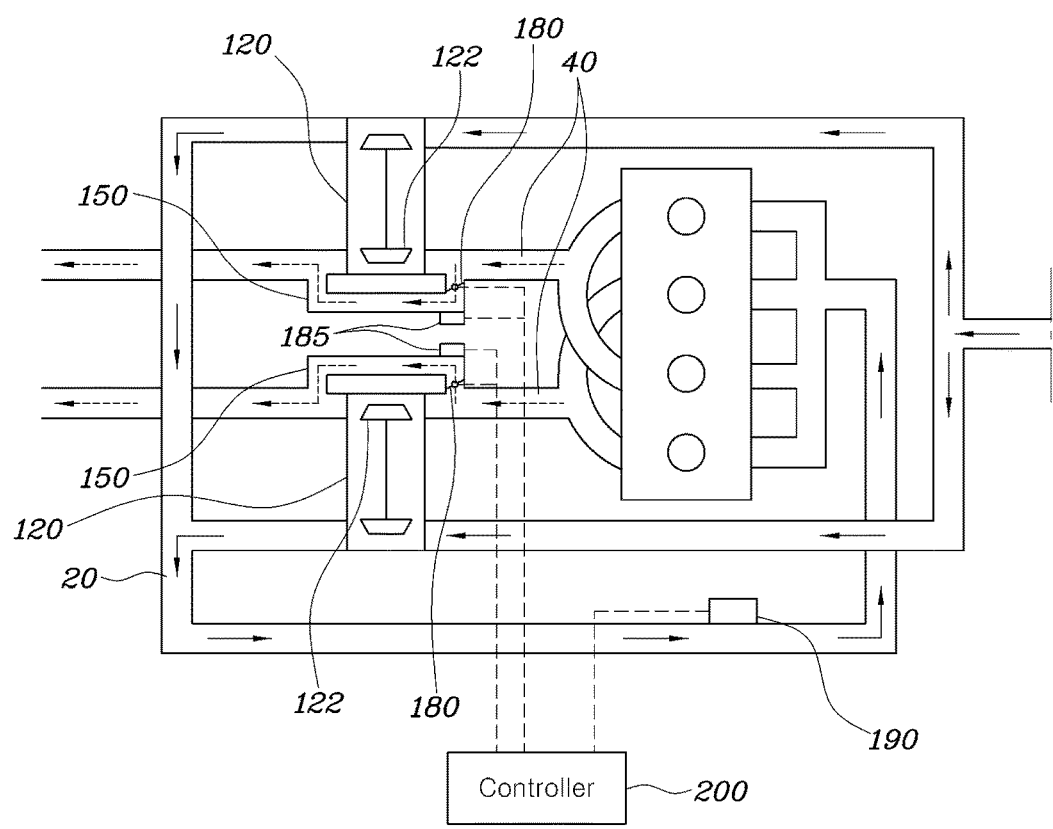
FIG. 2 is a view of a system for controlling a turbocharger of a vehicle according to an exemplary embodiment of the present disclosure.

As shown in FIGS. 1 and 2, the method of controlling a turbocharger of a vehicle according to an exemplary embodiment of the present disclosure includes, in one embodiment: an opening ratio determining step S100 of determining, by a controller 200, a target boost pressure of intake air of a plurality of turbochargers 120 according to vehicle driving conditions, and determining target opening ratios of a plurality of wastegates 180 respectively provided in the plurality of turbochargers 120, according to the target boost pressure; an opening ratio determining step S200 of determining, by the controller 200, whether or not a current opening ratio detected by an opening ratio sensor of any one wastegate of the plurality of wastegates 180 is lower than the target opening ratio of the associated wastegate 180 by a reference value or less; and an overspeed rotation preventing step S300 of limiting, by the controller 200, the maximum rpm of a turbocharger 120 having the associated wastegate 180 when it is determined that the current opening ratio of the associated wastegate 180 is lower than the target opening ratio by the reference value or less, and preventing overspeed rotation of the turbocharger 120.

Described in detail, at the opening ratio determining step S100, the controller 200 sets the target boost pressure of intake air that is to be boosted by the plurality of turbochargers 120, according to the vehicle driving conditions, and further sets the target opening ratios of the wastegates 180 respectively provided in the plurality of turbochargers 120, according to the pre-set target boost pressure.

In the present disclosure, the plurality of turbochargers 120 is provided to boost intake air. Here, the plurality of turbochargers 120 may be arranged in a serial manner or a parallel manner. In the exemplary embodiment of FIG. 2, the plurality of turbochargers 120 are arranged in a parallel manner in which intake air boosted by the respective turbochargers 120 is joined at the downstream of the plurality of turbochargers 120 by a single flow line.

Here, the controller 200 sets the target boost pressure of intake air of the turbochargers 120 according to the vehicle driving conditions. Examples of the vehicle driving conditions, or characteristics, may be a vehicle speed, a fuel injection amount, a target torque, etc. The target boost pressure of intake air may increase during high speed driving or quick acceleration of a vehicle, and the rpm values of the turbochargers 120 are determined depending on the target boost pressure of intake air of the turbochargers 120.

Here, the relationship between the vehicle driving conditions and the target boost pressure and the relationship between the target boost pressure and the rotational speeds or the rpms of the turbochargers 120 may be pre-set in the controller 200 or may be determined using a data map stored in the controller 200. Further, the relationships between respective variables may be variously changed.

Further, since a plurality of turbochargers 120 are provided in the present disclosure, the boost pressure of the plurality of turbochargers 120 is mixed together in the single flow line of intake air, thereby realizing the target boost pressure of the total intake air.

In addition, although the rpms of the turbochargers 120 may be controlled in various manners, the rpms of the turbochargers 120 in the present disclosure are controlled by using the wastegates 180 that control the flow rates of exhaust gases passing through respective turbines 122 of the turbochargers 120. In the present disclosure, one wastegate 180 may be provided in each of the turbochargers 120, so the number of wastegates 180 may be equal to that of the plurality of turbochargers 120.

The wastegates 180 are provided on the respective bypass lines 150 of exhaust gases that pass through the respective turbines 122 of the turbochargers 120. In the present disclosure, when a wastegate 180 is closed, all the exhaust gases flowing to an associated turbocharger 120 pass through the turbine 122 of turbocharger 120, so the rotational speed of the turbocharger 120 increases although the vehicle is driven under the same driving conditions. On the contrary, when a wastegate 180 is opened, the flow rate of exhaust gases flowing to an associated turbocharger 120 is reduced, so the rotational speed of the turbocharger 120 is reduced.

In other words, in the present disclosure, when the opening ratio of a wastegate 180 increases, the rotational speed of an associated turbocharger 120 having the wastegate 180 will be reduced. However, when the opening ratio of a wastegate 180 is reduced, the rotational speed of the turbocharger 120 having the wastegate 180 will increase. Due to the above-mentioned relationships, once the target boost pressure is set, the controller 200 can determine the rotational speeds of the respective turbochargers 120 capable of realizing the target boost pressure. Further, the target opening ratios of the wastegates 180 respectively provided in the turbochargers 120 are individually determined according to the rotational speeds of the respective turbochargers 120.

Further, at the opening ratio determining step S200, the controller 200 determines whether or not the current opening ratio detected by an opening ratio sensor 185 of any one wastegate 180 of the plurality of wastegates 180 is lower than the target opening ratio thereof by the reference value or less.

In this case, the controller 200 compares the current opening ratios of the plurality of wastegates 180 to the target opening ratios thereof and analyzes the comparison results. Here, the current opening ratios are the real opening ratios detected by the opening ratio sensors 185 respectively provided to the wastegates 180.

When driving the turbochargers 120 having the respective wastegates 180, the current opening ratio of a wastegate 180 may fail to reach the target opening ratio thereof because of various impurities within exhaust gases adhered to the wastegate 180 or due to an operational error of the wastegate 180.

For example, when a wastegate 180 fails to realize the target opening ratio thereof due to impurities adhered thereto and the current opening ratio of the wastegate 180 is higher than the target opening ratio, the rotational speed of the turbocharger 120 having the wastegate 180 cannot reach a target value. Accordingly, the current boost pressure in this case is lower than the target boost pressure.

On the contrary, when the current opening ratio of the wastegate 180 is lower than the target opening ratio, the rotational speed of the turbocharger 120 having the wastegate 180 increases over the target value. When this condition further progresses, the rpm of the turbocharger 120 exceeds the critical rpm, and this may cause adverse conditions of the turbocharger 120.

The above-mentioned conditions act as important factors in the present disclosure in which the plurality of turbochargers 120 are provided. This is due to the fact that when the rpm of any one turbocharger 120 is not appropriately controlled, the remaining turbochargers 120 may fail to perform a desired operation.

For example, when the current opening ratio of the wastegate 180 of any one turbocharger 120 is higher than the target opening ratio, the rpm of the turbocharger 120 having the wastegate 180 is lower than the target value.

Accordingly, when measuring a current boost pressure at the downstream of the plurality of turbochargers 120, the measured current boost pressure may be lower than the target boost pressure. In this case, to increase the current boost pressure to the target boost pressure, the opening ratios of the remaining turbochargers 120 may be controlled to be reduced, and thus the rotational speeds of the turbochargers 120 may increase. In this case, the rotational speed of a turbocharger 120 may increase to exceed a critical rpm, and the turbocharger 120 may be not functioning properly.

However, when the malfunction of the boosting system using the turbochargers 120 is checked based on the determination result of whether or not the current boost pressure satisfies the target boost pressure as described above, the following problem may occur. That is, even when any one wastegate 180 malfunctions, the target boost pressure of intake air may be realized, so the controller 200 may fail to recognize the malfunction of the wastegate 180. In this case, the turbocharger 120 having the wastegate 180 may rotate at an overspeed and may be suffer an adverse event.

Further, when the current opening ratio of the wastegate 180 provided in any one turbocharger 120 is lower than the target opening ratio, the turbocharger 120 having the wastegate 180 may be broken. In addition, the pressure or the flow rate of exhaust gases flowing to the remaining turbochargers 120 in this case may increase due to interference between, or the influence of, exhaust gases.

Accordingly, when the current opening ratio of the wastegate 180 of any one turbocharger 120 is lower than the target opening ratio thereof, the rotational speeds of the remaining turbochargers 120 having respective wastegates 180 may increase, so breakage may be propagated to all the turbochargers 120.

To solve this problem, in the present disclosure, the controller 200 compares the current opening ratios of the plurality of wastegates 180 to the respective target opening ratios, and determines whether or not any wastegate 180 of which the current opening ratio is lower than the target opening ratio thereof by the reference value or less is presented, thereby determining a malfunction of the turbocharger 120 having the wastegate 180.

Further, when it is determined at the overspeed rotation preventing step S300 that the current opening ratio of a wastegate 180 is lower than the target opening ratio thereof by the reference value or less, the controller 200 limits the maximum rpm of the turbocharger 120 having the associated wastegate 180, thereby preventing overspeed rotation of the turbocharger 120.

Described in detail, when the current opening ratio of any one wastegate 180 is lower than the target opening ratio thereof by the reference value or less, the turbocharger 120 having the associated wastegate 180 rotates at an rpm exceeding the target rpm.

As described above, the method of checking the malfunction of the turbochargers 120 by determining whether or not the current boost pressure of intake air measured by the boost pressure sensor 190 satisfies the target boost pressure is problematic as follows. Even when the rpm of any one turbocharger 120 exceeds the critical rpm, the remaining turbochargers 120 may be maintained at low rpms, so the controller may determine that the current boost pressure of intake air satisfies the target boost pressure and may cause breakage of the turbocharger 120 without recognizing the malfunction of the turbocharger 120.

However, the present disclosure can correctly and efficiently determine the malfunction of the wastegates 180 by checking the opening ratios of the wastegates 180 respectively provided in the plurality of turbochargers 120. When the current opening ratio of any one wastegate 180 is lower than the target opening ratio thereof by the reference value or less, the controller 200 of the present disclosure limits the maximum rpm of the turbocharger 120 having the associated wastegate 180, thereby efficiently preventing breakage of the turbocharger 120.

The reference value may be determined experimentally or theoretically in various manners in view of improving control strategy. Here, the reference value may be a deviation value that is calculated experimentally or theoretically by using the target opening ratio as a variable to reach a level capable of limiting the maximum rpm of the turbocharger.

Further, the reference value may be determined in various manners by those skilled in the art to provide a significant value capable of preventing breakage of the turbochargers 120 while considering the target opening ratios. For example, the reference value may be determined in consideration of a safety factor in addition to the above-mentioned factors.

Further, the limitation on the maximum rpms of the turbochargers 120 may be realized in various manners, for example, by a change in the target opening ratio or in the target boost pressure. In other words, in the present disclosure, when it is determined that a wastegate 180 malfunctions, the maximum rpm of the turbocharger 120 having the wastegate 180 is limited and the turbocharger 120 may be protected from breakage.

FIG. 1 is a flowchart of the method of controlling a turbocharger of a vehicle according to the present disclosure, and FIG. 2 is a view of the system for controlling a turbocharger of a vehicle according to the present disclosure.

In the method of controlling the turbocharger of the vehicle according to an exemplary embodiment of the present disclosure, the reference value is pre-set for each of the plurality of wastegates 180 and is stored in the controller 200.

As described above, in the present disclosure, it is determined whether or not any one wastegate 180 malfunctions. Here, due to the difference between the design factors of the turbochargers 120, the wastegates 180 of the turbochargers 120 may be broken at different rpms.

Therefore, in the exemplary embodiment of the present disclosure, the reference values used to prevent breakage of the wastegates 180 having respective target opening ratios are determined separately for the respective wastegates 180, so the control method and system of the present disclosure can more efficiently control the respective turbochargers 120.

In other words, in the control method according to the embodiment of the present disclosure, the reference values for the wastegates 180 are independently determined in consideration of critical rpms of the turbochargers 120 having the respective wastegates 180.

Specifically, to determine the reference values used to prevent breakage of the turbochargers 120 while considering the respective target opening ratios, various methods may be used. In an embodiment of the present disclosure, the reference values may be determined in consideration of the critical rpms of the turbochargers 120 having the wastegates 180.

Described in detail, the reference values for the plurality of wastegates 180 may be determined in consideration of both the target opening ratios of the wastegates 180 and the critical rpms of the turbochargers 120 having the wastegates 180. In addition to the above-mentioned method, the reference values for the plurality of wastegates 180 may be determined by those skilled in the art in various manners with the consideration of the critical rpms of the turbochargers 120.

Briefly described, in an embodiment of the present disclosure, a malfunction of the turbochargers 120 is checked based on design factors of both the turbochargers 120 and the wastegates 180, so the present disclosure can reduce the probability of making an error in judgment and can efficiently prevent breakage of the turbochargers 120.

Further, in the method of controlling a turbocharger of a vehicle according to an embodiment of the present disclosure, when the controller 200 determines, at the overspeed rotation preventing step S300, that the current boost pressure of intake air is equal to or lower than the target boost pressure and the current opening ratio of the wastegate 180 is lower than the target opening ratio by the reference value or less, the controller 200 limits the maximum rpm of the turbocharger 120 having the wastegate 180 and thus prevents overspeed rotation of the turbocharger 120.

In other words, when the current boost pressure of intake air measured by the boost pressure sensor 190 at the downstream of the plurality of turbochargers 120 is higher than the target boost pressure, only the measurement of the boost pressure of intake air may be used to efficiently check the probability of breakage of the turbochargers 120.

The present disclosure is particularly effective in a condition where the current boost pressure is equal to or lower than the target boost pressure and it is impossible to check the probability of breakage of the turbochargers 120 by comparison of the current boost pressure to the target boost pressure.

Even when the rpm of any one turbocharger of the plurality of turbochargers 120 changes because of the control for the malfunction of the wastegate 180, the target boost pressure may be realized due to the control for the rpms of the remaining turbochargers 120, so the malfunction of the turbocharger 120 may not be found.

To more efficiently determine the possibility of breakage of any one turbocharger 120 in the above case, the present disclosure is configured as follows, in some embodiments. That is, when the current boost pressure is equal to or lower than the target boost pressure and the current opening ratio of a wastegate 180 is lower than the target opening ratio thereof by the reference value or less, the controller 200 limits the maximum rpm of the turbocharger 120 having the wastegate 180, and thus efficiently prevents breakage of the turbocharger 120.

Described in detail, in the method of controlling a turbocharger of a vehicle according to an embodiment of the present disclosure, the controller 200 limits, at the overspeed rotation preventing step S300, the maximum rpm of at least one turbocharger 120 including the turbocharger 120 having the wastegate 180 of which the current opening ratio is lower than the target opening ratio by the reference value or less.

When a plurality of turbochargers 120 like the present disclosure are provided in a vehicle, the malfunction of any one turbocharger 120 may exert an adverse effect on the operation of remaining turbochargers 120, and may cause breakage of the plurality of turbochargers 120.

In other words, when the current opening ratio of the wastegate 180 of any one turbocharger 120 is equal to or higher than the target opening ratio, the remaining turbochargers 120 may be controlled to increase the rpms thereof and to realize the target boost pressure according to vehicle driving conditions. In this case, the rpms of the remaining turbochargers 120 may exceed the critical rpms. When the current opening ratio of the wastegate 180 of any one turbocharger 120 is equal to or lower than the target opening ratio, the rotational speed of the turbocharger 120 adversely increases and exhaust gases may not efficiently flow to the turbocharger 120. Thus, the pressure or the flow rate of exhaust gases flowing to the remaining turbochargers 120 in this case may increase, thereby causing an increase in the rotational speeds of the remaining turbochargers 120.

Accordingly, in an embodiment of the present disclosure, when it is determined that the current opening ratio of the wastegate 180 of any one turbocharger 120 is lower than the target opening ratio by the reference value or less, the controller 200 limits the maximum rpm of at least one turbocharger 120 including the turbocharger 120 having the wastegate 180 of which the current opening ratio is lower than the target opening ratio by the reference value or less.

Here, the limitation on the maximum rpm of the turbocharger 120 may be realized in various manners, for example, by increasing the target opening ratio of the wastegate 180, by limiting the output power of an engine or by reducing the target boost pressure of intake air.

Further, in the method of controlling a turbocharger of a vehicle according to an embodiment of the present disclosure, the controller 200 limits the maximum rpms of the turbochargers 120 by limiting the target boost pressure at the overspeed rotation preventing step S300.

In detail, the target opening ratios of the respective wastegates 180 are determined based on the target boost pressure of intake air pre-set according to the vehicle driving conditions. Therefore, in an embodiment of the present disclosure, the target opening ratios of the wastegates 180 may be limited by limiting the target boost pressure. Thus, it is possible to limit the maximum rpms of the respective turbochargers 120 and this embodiment of the present disclosure may be efficiently adapted to achieve a limitation on the maximum rpm of at least one turbocharger 120.

In the method of controlling a turbocharger of a vehicle according to an embodiment of the present disclosure, the controller 200 controls the plurality of wastegates 180 using a stored data map in which the target opening ratios of the plurality of wastegates 180 are pre-set according to the target boost pressure of intake air.

In other words, the controller 200 is stored with a data map in which the target opening ratios of the respective wastegates 180 are pre-set according to a variation in the pre-set target boost pressure of intake air. Due to the data map, the controller 200 can quickly control the wastegates 180 without additionally performing a calculation of the target boost pressure according to vehicle driving conditions or a calculation of the target opening ratios of the wastegates 180 according to the target boost pressure.

In addition, as shown in FIG. 2, the system for controlling a turbocharger of a vehicle according to the present disclosure includes, in some embodiments: a plurality of turbochargers 120; a plurality of wastegates 180 respectively provided in the turbochargers 120 and functioning to control the flow rates of exhaust gases passing through the turbochargers 120; a plurality of opening ratio sensors 185 provided to the respective wastegates 180 and functioning to measure the opening ratios of the wastegates 180; a boost pressure sensor 190 provided on an intake air flow line 20 at a location in the downstream of the plurality of turbochargers 120 and functioning to detect a current boost pressure of intake air; and a controller 200 that sets a target boost pressure of intake air of the plurality of turbochargers 120 according to vehicle driving conditions, sets target opening ratios of the plurality of wastegates 180 according to the target boost pressure, determines whether or not the current opening ratio detected by an opening ratio sensor 185 of any one wastegate of the plurality of wastegates 180 is lower than the target opening ratio of the associated wastegate 180 by a reference value or less, and limits the maximum rpm of the turbocharger 120 having the associated wastegate 180 when it is determined that the current opening ratio is lower than the target opening ratio by the reference value or less, and thus prevents overspeed rotation of the turbocharger 120.

Described in detail, in the present disclosure, a plurality of turbochargers 120 is provided. In an exemplary embodiment of the present disclosure shown in FIG. 2, two turbochargers 120 and two exhaust gas lines 40 are provided. In the two exhaust gas lines 40, respective turbines 122 of the two turbochargers 120 are placed.

The turbochargers 120 may be arranged in a serial manner or a parallel manner. In the exemplary embodiment of FIG. 2, the two turbochargers 120 are arranged in a parallel manner. Here, two intake air flow lines 20 are provided such that the intake air flow lines 20 respectively passing through the two turbochargers 120 are separated from each other. The two intake air flow lines 20 are joined together at the downstream of the turbochargers 120 by a single flow line.

Further, the wastegates 180 are provided in the plurality of turbochargers 120, respectively. Thus, in the present disclosure, the plurality of wastegates 180 is provided and functions to control the flow rates of exhaust gases that pass through the turbochargers 120 having the respective wastegates 180.

Specifically, in the present disclosure, bypass lines 150 are provided to respectively bypass the turbines 122 of the turbochargers 120, and the wastegates 180 are provided in the respective bypass lines 150 to control the opening ratios of the bypass lines 150.

Accordingly, as the opening ratios of the wastegates 180 increase, the flow rates of exhaust gases that bypass the respective turbines 122 of the turbochargers 120 increase and the rpms of the turbochargers 120 are reduced.

Further, the opening ratio sensors 185 are provided to the plurality of wastegates 180, respectively, and function to measure the opening ratios of the wastegates 180. Here, it is not necessary to provide the opening ratio sensors 185 such that the opening ratio sensors 185 are physically divided from each other according to the respective wastegates 180, but it is sufficient that the sensors 185 are provided to individually measure the opening ratios of the wastegates 180. In the embodiment of FIG. 2, two opening ratio sensors 185 are provided to be assigned to the two wastegates 180.

The boost pressure sensor 190 is provided on the intake air flow line 20 at a location in the downstream of the plurality of turbochargers 120 and functions to detect the current boost pressure of intake air.

As described above, the boost pressure sensor 190 may be provided on the intake air flow line 20 at the downstream of the plurality of turbochargers 120 so that the boost pressure sensor 190 can measure the current boost pressure of intake air boosted by the plurality of turbochargers 120.

Accordingly, in the present disclosure, the current boost pressure inside the intake air flow line 20 measured by the boost pressure sensor 190 means the intake air boosting results performed by the plurality of turbochargers 120.

Further, in the system, the controller 200 functions as follows in some embodiments. The controller 200 sets the target boost pressure of intake air of the plurality of turbochargers 120 according to vehicle driving conditions, and sets the target opening ratios of the plurality of wastegates 180 according to the target boost pressure. The controller 200 also determines whether or not a current opening ratio detected by an opening ratio sensor 185 of any one wastegate of the plurality of wastegates 180 is lower than the target opening ratio of the associated wastegate 180 by a reference value or less, and limits the maximum rpm of the turbocharger 120 having the associated wastegate 180 when it is determined that the current opening ratio is lower than the target opening ratio by the reference value or less. The controller 200 thus prevents an overspeed rotation of the turbocharger 120.

Therefore, even when a plurality of turbochargers 120 is provided in a vehicle, the control system of the present disclosure can correctly and efficiently determine the malfunction of any one turbocharger 120, thereby efficiently preventing breakage of the turbocharger 120.

Although an embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of controlling a turbocharger of a vehicle, the method comprising:

determining, by a controller, a target boost pressure of intake air of a plurality of turbochargers according to one or more vehicle driving conditions, and determining target opening ratios of a plurality of wastegates respectively provided in the plurality of turbochargers, according to the target boost pressure;

determining, by the controller, whether or not a current opening ratio detected by an opening ratio sensor of any one wastegate of the plurality of wastegates is lower than the target opening ratio of the associated wastegate by a reference value; and limiting, by the controller, a maximum rpm of the turbocharger having the associated wastegate when it is determined that the current opening ratio of the associated wastegate is lower than the target opening ratio by the reference value.

2. The method of claim 1, wherein the reference value is pre-set for each of the plurality of wastegates and is stored in the controller.

3. The method of claim 2, wherein the reference value is pre-set in such a way that reference values of the respective wastegates are individually determined in consideration of critical rpms of the turbochargers having the respective wastegates.

4. The method of claim 1, wherein the controller limits the maximum rpm of the turbocharger having the associated wastegate when it is determined that a current boost pressure of intake air is equal to or lower than the target boost pressure and the current opening ratio of the associated wastegate is lower than the target opening ratio by the reference value.

5. The method of claim 1, wherein the controller limits the maximum rpm of at least one turbocharger including the turbocharger having the wastegate of which the current opening ratio is lower than the target opening ratio by the reference value.

6. The method of claim 1, wherein the controller limits the maximum rpm of the turbocharger by limiting the target boost pressure.

7. The method of claim 1, wherein the controller controls the plurality of wastegates using a data map in which the target opening ratios of the plurality of wastegates are pre-set according to the target boost pressure of intake air.

8. A system for controlling a turbocharger of a vehicle, the system comprising:

a plurality of turbochargers;

a plurality of wastegates respectively provided in the turbochargers and controlling flow rates of exhaust gases passing through the turbochargers;

a plurality of opening ratio sensors provided at the respective wastegates and measuring opening ratios of the wastegates;

a boost pressure sensor provided on an intake air flow line at a location in a downstream of the plurality of turbochargers and detecting a current boost pressure of intake air; and a controller that sets a target boost pressure of intake air of the plurality of turbochargers according to vehicle driving conditions, sets target opening ratios of the plurality of wastegates according to the target boost pressure, determines whether or not a current opening ratio detected by an opening ratio sensor of any one wastegate of the plurality of wastegates is lower than the target opening ratio of the associated wastegate by a reference value, limits a maximum rpm of the turbocharger having the associated wastegate when it is determined that the current opening ratio is lower than the target opening ratio by the reference value.

* * * * *